United States Patent
Chou et al.

(10) Patent No.: US 9,467,673 B2
(45) Date of Patent: Oct. 11, 2016

(54) METHOD, SYSTEM, AND COMPUTER-READABLE MEMORY FOR RHYTHM VISUALIZATION

(71) Applicant: INSTITUTE FOR INFORMATION INDUSTRY, Taipei (TW)

(72) Inventors: Shih-Chun Chou, Taipei (TW); Bo-Fu Liu, Tainan (TW); Yu Fan Lin, Taipei (TW); Yi Chun Hsieh, Taipei (TW); Shih Yao Wei, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 193 days.

(21) Appl. No.: 14/252,124

(22) Filed: Apr. 14, 2014

(65) Prior Publication Data

US 2015/0155006 A1    Jun. 4, 2015

(30) Foreign Application Priority Data

Dec. 4, 2013 (TW) .............................. 102144370 A

(51) Int. Cl.
*H04N 9/802* (2006.01)
*G11B 27/031* (2006.01)
*G11B 27/02* (2006.01)

(52) U.S. Cl.
CPC ............. *H04N 9/802* (2013.01); *G11B 27/031* (2013.01); *G11B 27/02* (2013.01)

(58) Field of Classification Search
None
See application file for complete search history.

(56) References Cited

U.S. PATENT DOCUMENTS

| | | | |
|---|---|---|---|
| 6,177,623 B1* | 1/2001 | Ooseki | A63F 13/10 84/477 R |
| 7,698,238 B2 | 4/2010 | Barletta | |
| 7,711,155 B1* | 5/2010 | Sharma | G06K 9/00288 345/419 |
| 2004/0264917 A1* | 12/2004 | Braun | G10H 1/368 386/201 |
| 2006/0083218 A1* | 4/2006 | Sako | A61B 5/024 370/352 |
| 2007/0258656 A1* | 11/2007 | Aarabi | G06K 9/00228 382/254 |
| 2009/0132593 A1 | 5/2009 | Lv | |
| 2010/0035688 A1 | 2/2010 | Picunko | |
| 2011/0015765 A1 | 1/2011 | Haughay, Jr. et al. | |
| 2011/0295843 A1* | 12/2011 | Ingrassia, Jr. | G06F 17/30053 707/723 |

OTHER PUBLICATIONS

Wei-Ting Chiang, "Interactive Facial Expression System", Master's Thesis, National Taiwan University of Science and Technology, Jul. 6, 2006.
Ferda Oi, et al., "Learn2Dance Learning Statistical Music-to-Dance Mappings for Choreography Synthesis", IEEE Transaction on Multimedia, vol. 14, No. 3, Jun. 2012.

* cited by examiner

*Primary Examiner* — Mark Zimmerman
*Assistant Examiner* — Yu-Jang Tswei
(74) *Attorney, Agent, or Firm* — Li & Cai Intellectual Property (USA) Office

(57) ABSTRACT

Disclosure in the description is related to a method for rhythm visualization, a system, and computer-readable storage. The invention allows the system to visualize the rhythm according to audio signals and personal features made by individual. In the method according to one embodiment, a personal image is firstly captured, and features can be extracted from the image. A personalized image is therefore created based on the features. Next, audio features are extracted from the audio signals. A personalized rhythm configuration can be obtained. A personalized rhythm video is therefore created based on the information related to the audio, personalized image, and the personalized rhythm configuration. Furthermore, a group rhythm video may also be obtained as integrating multiple personal rhythm data.

17 Claims, 10 Drawing Sheets

METHOD, SYSTEM, AND COMPUTER-READABLE MEMORY FOR RHYTHM VISUALIZATION

BACKGROUND

1. Technical Field

The present invention generally relates to a method, a system, and a non-transitory computer-readable medium for rhythm visualization, more particularly, relates to the method and system to visualize rhythm according to audio or body-motion information made by individual or group.

2. Description of Related Art

A person may swing with rhythm of the music that the person listens to, and even sing accompanied with the music. In the modern technology, some music players are provided to display the geometric patterns with rising and falling music being played. However the conventional technology lacks of any scheme creating the personalized images to be displayed based on the individual's rhythm or characteristics.

Further, the people may be influenced with each other due to the music or in a cordial atmosphere when they stay a music concert or a place gathering of crowds. For example, the people may shake their cellular phones which work as handheld fluorescent sticks with the music. It can be seem as people's rhythms and be used to establish the closer relationship between the performer and audience. However, the people's rhythms are not used to create a group visual image based on the conventional technologies.

SUMMARY

In view of the conventional technology lack of effective mechanism to provide interactive image corresponding to the individual or group activities with music, disclosure in accordance with the present invention is to a method of rhythm visualization. The method is provided to visualize the rhythm made by the individual or group when he or they act with the music or any circumstance. Further, the visualized rhythm, such as a video, is used to share or commonly use with others, rather than the present music share mechanism which merely shares the music with others or provides a music link for reference. However, the present music share mechanism has no any mechanism supporting sharing or interacting with others, but only playing music or displaying multimedia.

Provided in the disclosure is related a method and a system of rhythm visualization, and a computer-readable recording medium, rather than the present sharing scheme which is limited to transmit music files or provide cyber linking. In the method, the visualized rhythm is generated based on the features extracted from the audio signals and personal image. The visualized rhythm forms a video representing the personal or group common rhythm and reflects the emotion, reaction, or atmosphere associated with the audio signals made by the person or group.

According to one embodiment in the disclosure, the method for rhythm visualization may firstly capture a personal image. The image may be acquired by the camera function of a portable electronic apparatus. Then the personal features may be extracted from the personal image. A personalized image is created according to the personal features. Audio features may also be extracted from the audio signals. A personalized rhythm setting corresponding to the extracted audio features may be obtained from multiple pre-stored rhythm settings. According to the audio signals, personalized image, and the personalized rhythm setting, a personalized rhythm video is created.

In another aspect of the present invention, an acceleration signal may be acquired from a body-motion unit disposed in the portable electronic device. Based on the aforementioned audio signals, personalized image, personalized rhythm setting, and the acceleration signal, a personalized rhythm video reflecting the body motion is generated.

The integration of audio signals and the personalized rhythm setting renders the way to perform the personalized rhythm and its rhythm frequency. The body-motion signal renders an intensity of the personalized rhythm. A personalized rhythm video is therefore generated based on the acquired way to perform the rhythm, the rhythm frequency, and rhythm intensity.

In one further aspect of the disclosure, a server is introduced to integrating multiple personalized rhythm videos to create a group rhythm video.

The related system of rhythm visualization may be implemented by a portable electronic apparatus; or by a remote server cooperated with the portable electronic apparatus. Main components of the system include an image retrieving unit for acquiring image, an audio retrieving unit for receiving audio signals, a feature retrieving unit for acquiring features of personal or/and audio signals, a computing unit for acquiring the personalized rhythm video by means of computation, and a display unit for displaying the personalized rhythm video. Further, a body-motion unit may be provided for acquiring acceleration signals made by accelerator in the apparatus.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

DESCRIPTION OF THE EXEMPLARY EMBODIMENTS

Figure 1:
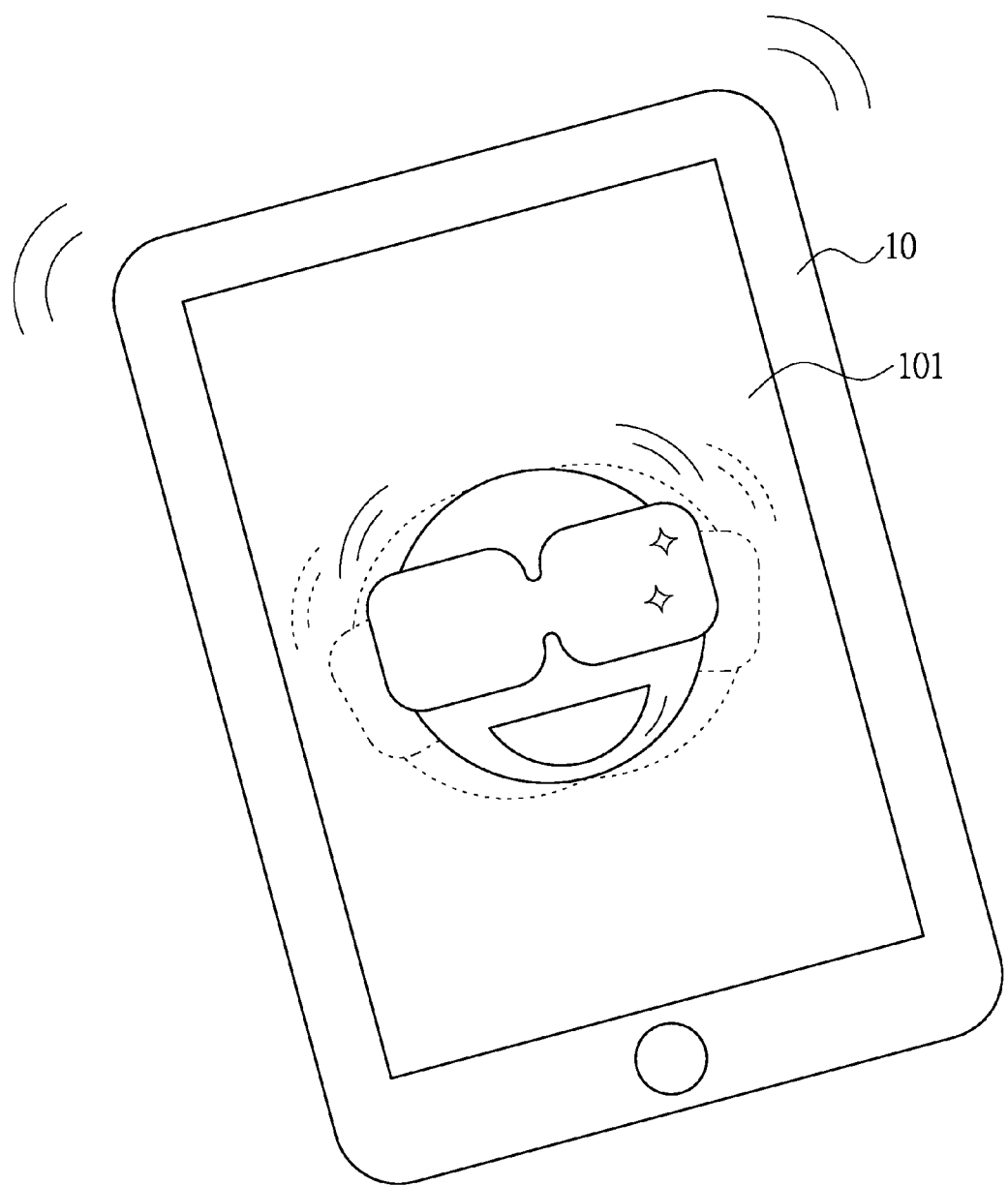
FIG. 1 shows a schematic diagram depicting a rhythm video displayed onto an electronic apparatus in one embodiment of the present invention.

Reference will now be made in detail to the exemplary embodiments of the present disclosure, examples of which are illustrated in the accompanying drawings. Wherever possible, the same reference numbers are used in the drawings and the description to refer to the same or like parts.

Disclosure herein is related to a method, a system, and a computer-readable media for rhythm visualizing. One of the objectives of the method is to generate a visualized rhythm image which reflects the personal or group rhythm according to the features extracted from the individuals' images and audio signals.

In one further aspect of the method, the visualized rhythm image may be generated according to the features of the individual person or people and audio features from audio signals. For example, when a person listens to music, his swinging motion with the music may be sensed by a body-motioned unit disposed in his handheld or worn electronic device. This electronic device is, but not limited to, such as a smart phone, tablet computer, intelligent glasses, intelligent watch or any other electronic device which is equipped with the body-motion unit. The body-motion signals generated by this body-motion unit are referred to create the personalized rhythm video. In another example, in a place where the people gather together, such as in a recital, music concert, or in a public event, the people may have the similar emotion or rhythm when music is played. The method and the related system are able to integrate individuals' personalized rhythm images to render a visualized rhythm video for reflecting the instant circumstance.

Through the method for visualizing the rhythm in accordance with the present invention, the personalized rhythm video may be displayed onto a display screen of the portable electronic apparatus. FIG. 1 shows a schematic diagram depicting a rhythm image on an electronic device. The connections made by the electronic devices or made by the units may be a wired or wireless communication network or via a cable over a bus, serial data communication interface, e.g. RS232, or the other types of connections.

A portable electronic apparatus 10 is shown in FIG. 1. The apparatus 10 is such as mobile phone or tablet computer having a display 101. The apparatus 10 is preferably a portable device equipped with a camera module (or video recorder, camera), a display, and a body-motion unit. The body-motion unit is such as an accelerometer or a gyroscope. This body-motion unit is used to generate the body-motion signals when a user waves or shakes this handheld apparatus 10. The body-motion signals are provided for determining the user's rhythm.

In some embodiments, the system for visualizing rhythm may be embedded into the portable electronic apparatus 10. The embedded system may obtain the user or other's face image taken by the camera module in the portable electronic apparatus 10. Then the system extracts the personal features from the face image and accordingly creates a personalized image. After that, the body-motion unit generates body-motion signals when the user waves the handheld portable electronic apparatus 10. The body-motion signal is such as an acceleration signal which is used to analyze the intensity and tempo of the rhythm. It is noted that the audio signals may be retrieved from the music files stored or generated in the portable electronic apparatus 10, or may be from external source through the microphone. The audio features may be extracted from the signals in a frequency domain, and the features are such as the frequency, tempo, volume, intensity and/or genre of music. Further, a corresponding personalized rhythm setting is obtained.

That means portable electronic apparatus 10 creates the personalized rhythm video according to the personalized rhythm setting, and its associated audio signals and personalized image. The personalized rhythm video is displayed onto the display 101 of the apparatus 10. For example, the personalized rhythm video is such as showing a face image which shakes with a specific frequency. This rhythm video may be modified by colors, geometric elements, image evolvement, speed change, and its variant rhythm modes for reflecting the personal emotion, reaction or feeling about the audio signals. The rhythm modes may be a rotation mode, a nodding mode, or a beating mode. The image may be shown as a planar image or a three-dimensional image.

Figure 2:
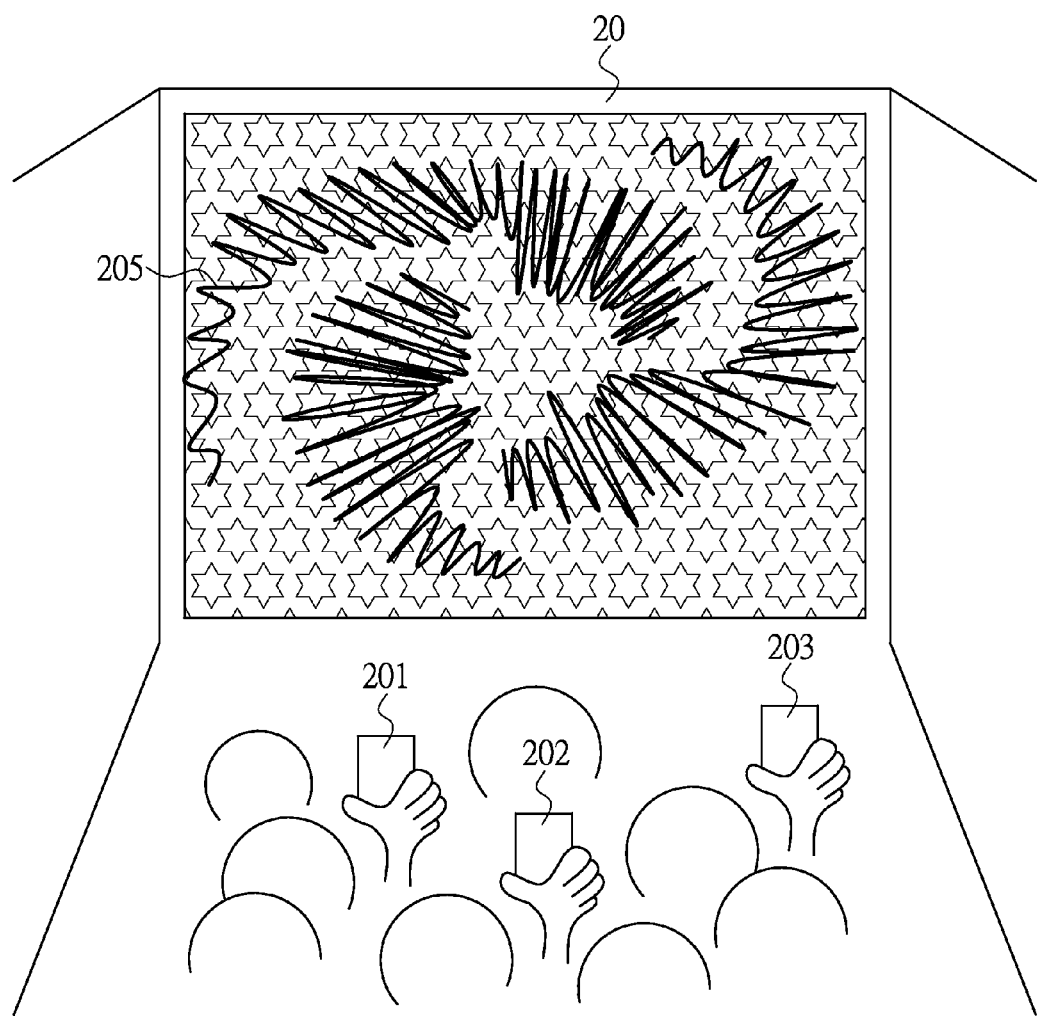
FIG. 2 shows a schematic diagram illustrating a group rhythm video in one embodiment of the invention.

Reference is made to FIG. 2. FIG. 2 shows a schematic diagram depicting a group rhythm image generated by the system according to the present invention.

In an embodiment, the system for implementing the rhythm visualization may be separately disposed in the portable electronic apparatuses the people hold, and a server host. The every portable electronic apparatus may be communicated with the server host over a communication network. The many portable electronic apparatuses are schematically described as the elements 201, 202, 203 shown in FIG. 1. For example, in a music concert, the music signals are made by instrumental music or vocal music. When many people handhold their portable electronic apparatuses 201, 202, 203, the many personalized rhythm videos corresponding to the apparatuses 201, 202, 203 can be created based on the foregoing method for rhythm visualization. The collected rhythm videos are transferred to a server host (not shown). The signals associated with the rhythm videos are integrated to create a group rhythm video 205 displayed onto a display screen 20. The group rhythm video 205 is created from assembling the plurality of personalized rhythm videos. The group rhythm video 205 may be created by additionally integrating the videos or images reflecting an instant circumstance, emotions, tempos, or intensities. For example, the brightness of flashing of the video or image may be greater when the intensity is higher with more people under the same circumstance.

In practice, the rhythm video is generated for showing the emotion in the music concert, and the rhythm video may strengthen the instant visual effect. In some embodiments, tempo of rhythm signals may correspond to a specific emotional parameter. The intensity of a rhythm video may be an average value made by multiple personalized rhythm signals.

Figure 3:
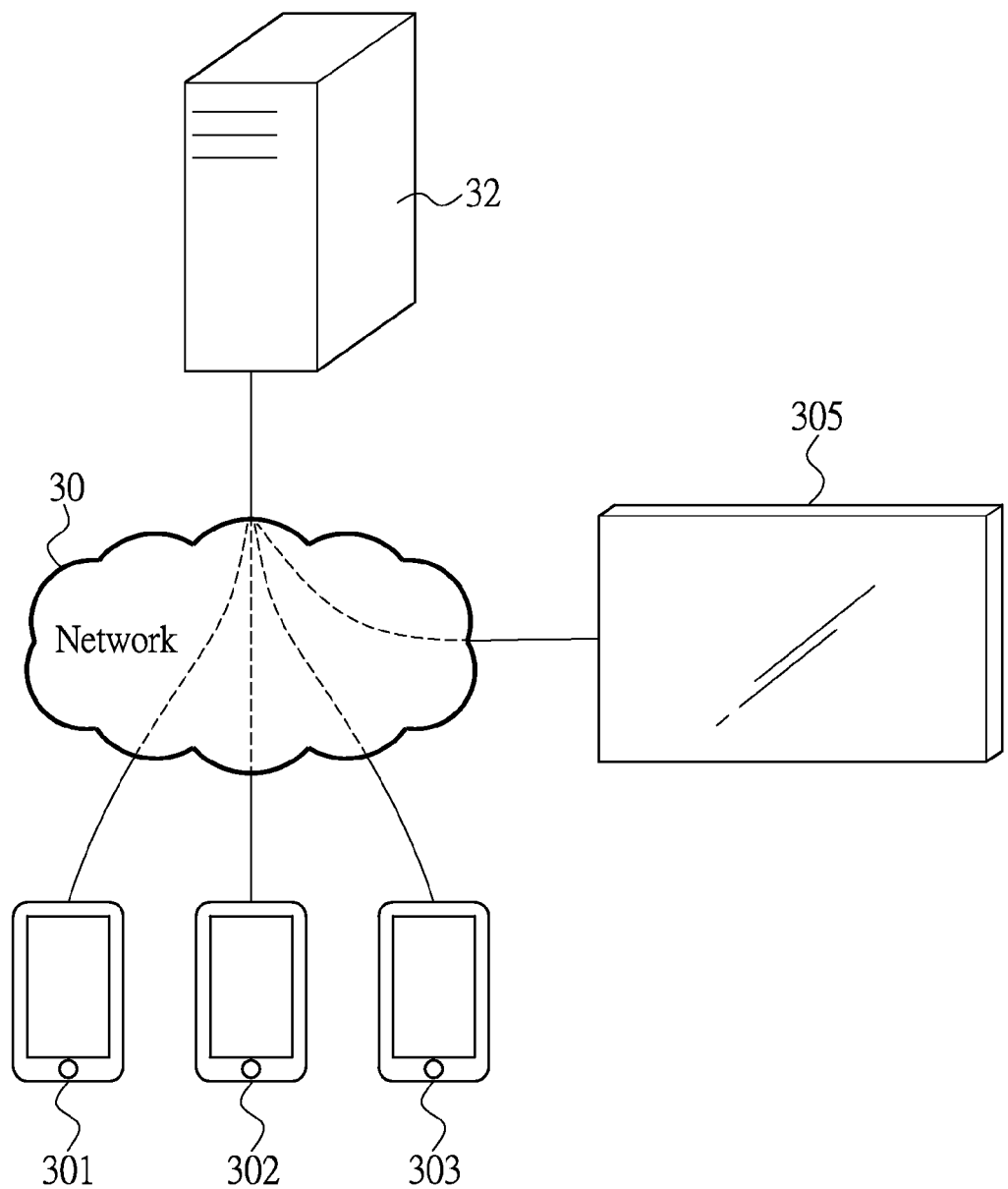
FIG. 3 schematically shows a system framework used to create a visualized group rhythm in one embodiment of the present invention.

FIG. 3 shows a framework of the system for generating a group rhythm video in accordance with one embodiment of the present invention.

Over the network 30 or any specific communication means, the various devices are connected. The devices are such as the shown portable electronic apparatuses 301, 302, 303. Each of portable electronic apparatus 301, 302, 303 includes a body-motion unit used to detect the motion for generating body-motion signals. The body-motion signals generated from the portable electronic apparatus (301, 302, and 303) are transferred to the server host 32 over the network 30. The server host 32 then creates a group rhythm video based on the received body-motion signals made by the user manipulating the every portable electronic apparatus 301, 302, or 303.

The group rhythm video created by the server host 32 may be displayed onto a public display screen 305. The display screen 305 may be a large screen disposed at a specific place. The video may also be transferred back to the every portable electronic apparatus 301, 302, 303, and displayed on the every device's display.

It can be applied with a social network community. For example, the server host 32 may constitute a community website which allows the users of the portable electronic apparatuses 301, 302, 303 to log on the community website and join a group. The community group may be created beforehand, temporarily, or automatically by the community website based on the information of similar positions of the portable electronic apparatuses. In an exemplary embodiment, while the users of portable electronic apparatuses 301, 302, 303 log in the community website located in the server host 32, the server host 32 may simultaneously receive the rhythm information, login account and personal data made by the apparatuses 301, 302, and 303, and instantly create the group rhythm video. The group rhythm video is shown on the display screen 305. With this group rhythm video, the users' accounts, personal data, or the friendship in the network community may be shown.

The server host 32 may not be limited to any specific type of computer. In one embodiment of the present invention, the one of the portable electronic apparatuses 301, 302, 303 can instead of the server host 32 for collecting the other apparatuses' rhythm information and delivering the group rhythm video to the others via the internet.

First Embodiment

Figure 4:
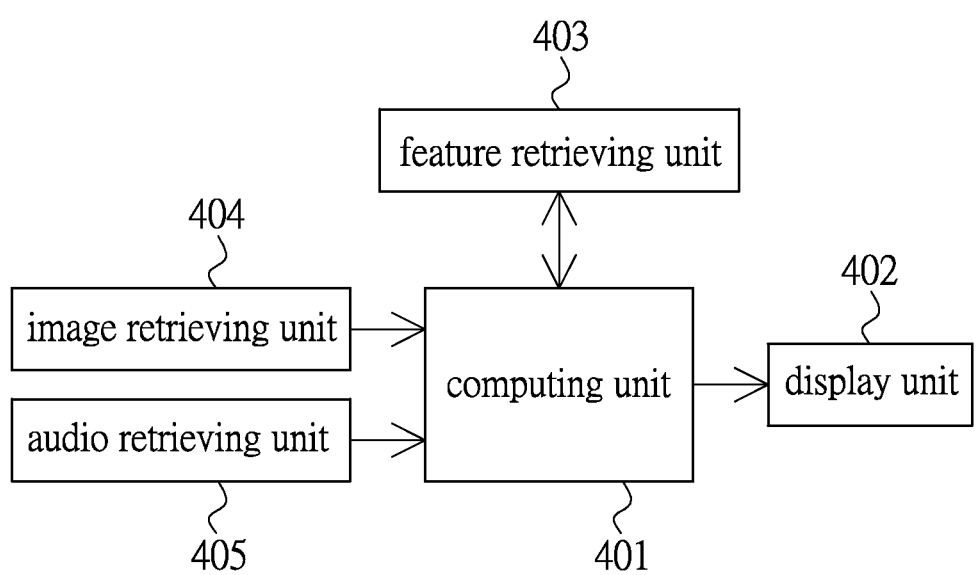
FIG. 4 shows a diagram depicting a system of rhythm visualization according to one embodiment of the present invention.

FIG. 4 shows a schematic diagram depicting the system of rhythm visualization in the first embodiment of the present invention.

For implementing creating the personalized rhythm video according to the personal features and audio signals, the system of rhythm visualization is provided. The system at least includes an image retrieving unit 404 for retrieving image. The image retrieving unit 404 is such as a camera module inside the portable electronic apparatus for producing a personal image. By the computation, the image features can be extracted from the personal image. The system includes an audio retrieving unit 405 for receiving audio signals. The audio retrieving unit 405 is used to receive the audio signals inside the apparatus such as music and sound files, or the signals made by the external sound. The system may then extract the audio features from the received audio signals.

Then the system further acquires the personal features and/or the audio features through a feature retrieving unit 403. The personal features may be extracted, by the image retrieving unit 404, from the image. The audio features are extracted, by the audio retrieving unit 405, from the system-received audio signals.

The system includes a computing unit 401 which is electrically connected to the feature retrieving unit 403. The computing unit 401 may firstly acquire the personal features made by the feature retrieving unit 403 and the audio features. Based on the audio features, a personalized rhythm setting corresponding to the audio features may be obtained from pre-stored multiple rhythm settings. The personalized rhythm video is created according to the audio features, the personal features, and the personalized rhythm setting. The production of the personalized rhythm video is used to be displayed by a display unit 402. It is noted that the multiple pre-stored rhythm settings may be configured in advance and be stored in the computing unit 401 or a memory thereto. The every rhythm setting is configured based on the specific audio features.

Second Embodiment

Figure 5:
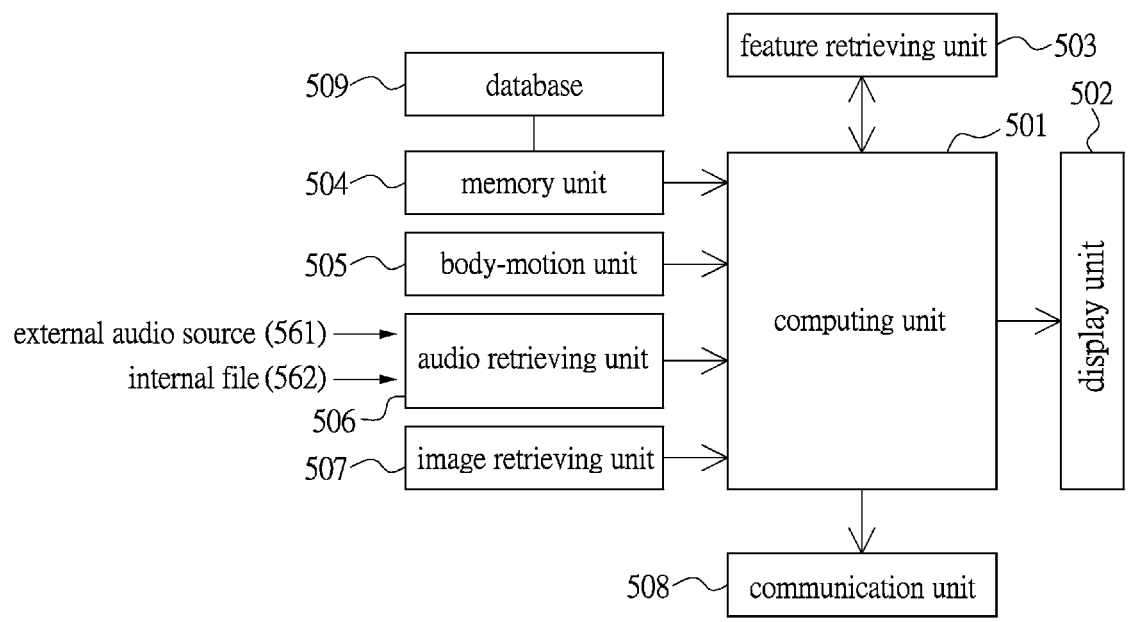
FIG. 5 shows a schematic diagram of the system of rhythm visualization in a second embodiment of the present invention.

Following the foregoing system according in one embodiment of the present invention, a schematic diagram in FIG. 5 illustrating the system of rhythm visualization for the second embodiment. The system exemplarily includes a body-motion unit 505, such as an accelerometer, used to generate acceleration signals. The acceleration signals are transferred to a computing unit 501. The computing unit 501 creates a personalized rhythm video through an algorithm based on the received acceleration signals. FIG. 5 schematically shows the system in one of the embodiments.

The computing unit 501 of the system of rhythm visualization is to integrate the signals made by the inner circuits or any software-implemented module and generate a computation result. The inner circuits are interconnected within the system. For example, an image retrieving unit 507 is used to retrieve an image especially the image with personal features. The image is such as the person's face image. A feature retrieving unit 503 is used to extract image features from the image. Further, the image features are incorporated to rendering a video which reflects a rhythm. For example, the video may be assembled of a series of dynamic graphic symbols and geometric icons, and varied in accordance with the rhythm in addition to presenting the personalized features. It is noted that the rhythm of video is based on the retrieved audio features. It is preferred that some rule models should be established in advance, and the models provide the rules to render variations of colors, sizes, positions, shapes, frequency of rotation and swing and the like of the symbols or icons based on the beats and speed of the audio signals. For example, when the audio features reflect an emotional state such as happy, the personalized rhythm setting regarding "happy" should be found out from the pre-stored rhythm settings. For example, the personalized rhythm setting may appear a color "blue" which represents the emotional state "happy", higher frequency for variations of shapes and swing, and larger movement of positions of the image.

The system further includes an audio retrieving unit 506 which is used to retrieve the audio signals, for example using a microphone to retrieve the signals made by an external audio source (561). The external audio source (561) is such as the external loudspeaker, environmental source, or the user's voice. Further, the audio signals played from the internal file (562) in the apparatus may also be one of the audio sources. The features extracted from the audio signals by the feature retrieving unit 503 are such as the frequency relating the tempo, higher or lower sound pitch, and intensity relating to the volume strength. In which the features such as frequency and intensity may reflect the emotion in the audio signals. For example, the genre of music may associate with a specific emotion, and the tempo may relate to another type of emotion.

A body-motion unit 505 such as an accelerometer disposed in the portable electronic apparatus is provided in the system. The body-motion unit 505 is used to detect motion such as shaking or swing made by the user manipulating the portable electronic apparatus. The system uses the motion to reflect the rhythm or emotion when the user acts as listening to music.

The system may have a memory unit 504. The memory unit 504 may be a buffer memory for the system's operations. The memory unit 504 may be configured to have a database 509 which records the data corresponding to the various audio signals, body-motion signals and emotions. For example, the database 509 has the information related to emotional ontology, data lookup table, judgment logics, artificial neutral networks, textual analysis, emotional dictionary, or any other information which is comparable. That means the aforementioned audio signals or body-motion signals can be used to judge the related type of emotion by analysis. The emotion to be found appears as a personalized or group rhythm video in accordance with one of the embodiments of the present invention.

A communication unit 508 of the system is used to process signals transmission such as the transmission among the apparatuses, server host and any terminal devices. The system may have a display unit 502 which is used to process the signals to be the rhythm video displayed on a display. The end display may be the display screen of the portable electronic apparatus or a public display.

According to one embodiment, the system may be implemented as an embedded system in a portable electronic apparatus. The embedded system allows the electronic apparatus to take on the task of rhythm visualization by its own computing capability. The embedded system is able to generate a personalized rhythm video according to the image features, audio features, or/and body motion signals.

In one further embodiment of the invention, the system of rhythm visualization may be implemented as a system including one or more portable electronic apparatuses and a remote server host. For example, the part of task of rhythm visualization is performed in the portable electronic apparatus for generating image and extracting features. The server host is in charge of generating rhythm video when it receives the signals made by the portable electronic apparatus.

Third Embodiment

Figure 6:
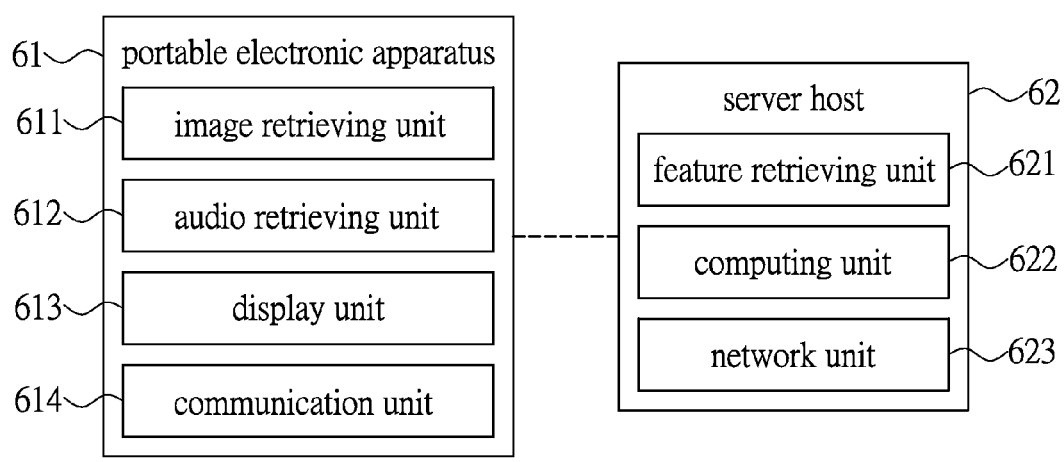
FIG. 6 shows one further embodiment of invention to describe the system of rhythm visualization.

The third embodiment is exemplarily described in FIG. 6. The task performed in a system, as shown in FIG. 6, is separated into a portable electronic apparatus 61 and a server host 62.

In the present embodiment, the portable electronic apparatus 61 is such as a terminal device handheld by the user. The apparatus 61 may be in charge of retrieving the personalized data. For example, the portable electronic apparatus 61 has an image retrieving unit 611 which is used to capture a personalized image such as a face image. Further, an audio retrieving unit 612 disposed in the apparatus 61 is used to retrieve the audio signals which may be the music played by the apparatus 61 or the signals received from external source. The audio retrieving unit 612 then acquires the personalized audio features extracted from the audio signals. The portable electronic apparatus 61 has a display unit 613 which is used to process the personalized image and create a personalized rhythm image with respect to the personalized features. The personalized rhythm image may be shared with other devices or server through a communication unit 614 of the portable electronic apparatus 61.

Figure 12:
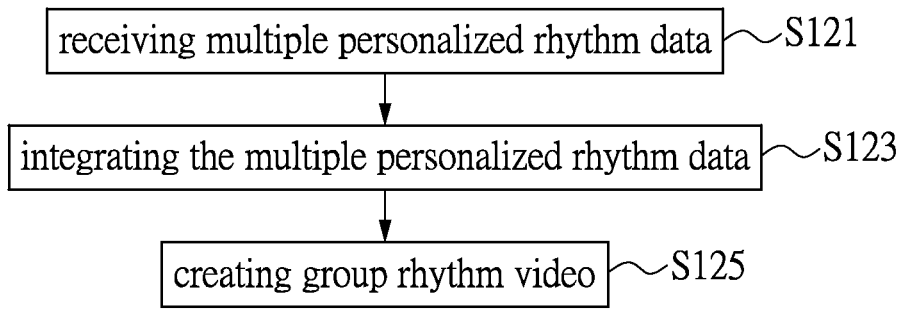
FIG. 12 shows a flow chart illustrating the method for visualizing rhythm in one further embodiment of the present invention.

The following exemplary description is in view of the method for visualizing rhythm in one embodiment of the present invention described in FIG. 12. When configured to form a group rhythm video, the portable electronic apparatus 61 actively transfers the personalized rhythm image and the related audio signals to a server host 62. If a plurality of users use their own portable electronic apparatuses to generate their personalized rhythm images, those images may be transferred to the server host 62 over a communication network. The server host 62 may therefore receive multiple personalized rhythm data, as described in step S121 of FIG. 12. The server host 62 integrates the multiple received personalized rhythm images, as described in step S123 of FIG. 12. A group rhythm video is therefore created, as described in step S125 of FIG. 12. For example, if the personalized rhythm image is the person's face image, the server host 62 collects and integrates those face images into one image which may swing with the audio. Alternatively, the server host 62 may create an interactive image by pairing the different face images.

The server host 62 has a network unit 623. The every terminal device connects with the server host 62 over a network. A feature retrieving unit 621 in the server host 62 is used to process the personalized data received from the every portable electronic apparatus 61, and extract features therefrom. A computing unit 622, in the server host 62, is then used to compute the features obtained from the rhythm data and create an end group product such as the group rhythm video. The group rhythm video is then transferred to a specified destination over a network, for example to a host with a large display screen, or to portable electronic apparatuses.

That means, under the framework described in FIG. 6, the computation task made by the system of rhythm visualization may be distributed separately to the terminal device and the server end device. The mentioned image retrieving unit 611 for retrieving image, the audio retrieving unit 612 for retrieving audio signals, and the display unit 613 responsible for end display may be implemented by the portable electronic apparatus 61. However, the heavier operations such as extracting the audio features from the audio signals and image features from the images by the feature retrieving unit 621 or computation by the computing unit 622 using a specific algorithm may be performed in the server host 62. The exemplary framework allows the portable electronic apparatus to simplify production of image and audio signals, and to centralize the signals extraction and computation in the server host.

Besides the aforementioned framework to implement rhythm visualization, the system may also be fully disposed in the individual portable electronic apparatus and fully in server host. That means the every portable electronic apparatus includes all the functions of image retrieval, audio signals retrieval, feature extraction, data computation, and communication. The server host may instantly receive the image signals and audio signals from the every portable electronic apparatus and compute to form the video. Alternatively, the system may also directly receive the personalized rhythm videos formed in the multiple portable electronic apparatuses, and integrally form a group rhythm video.

Figure 7:
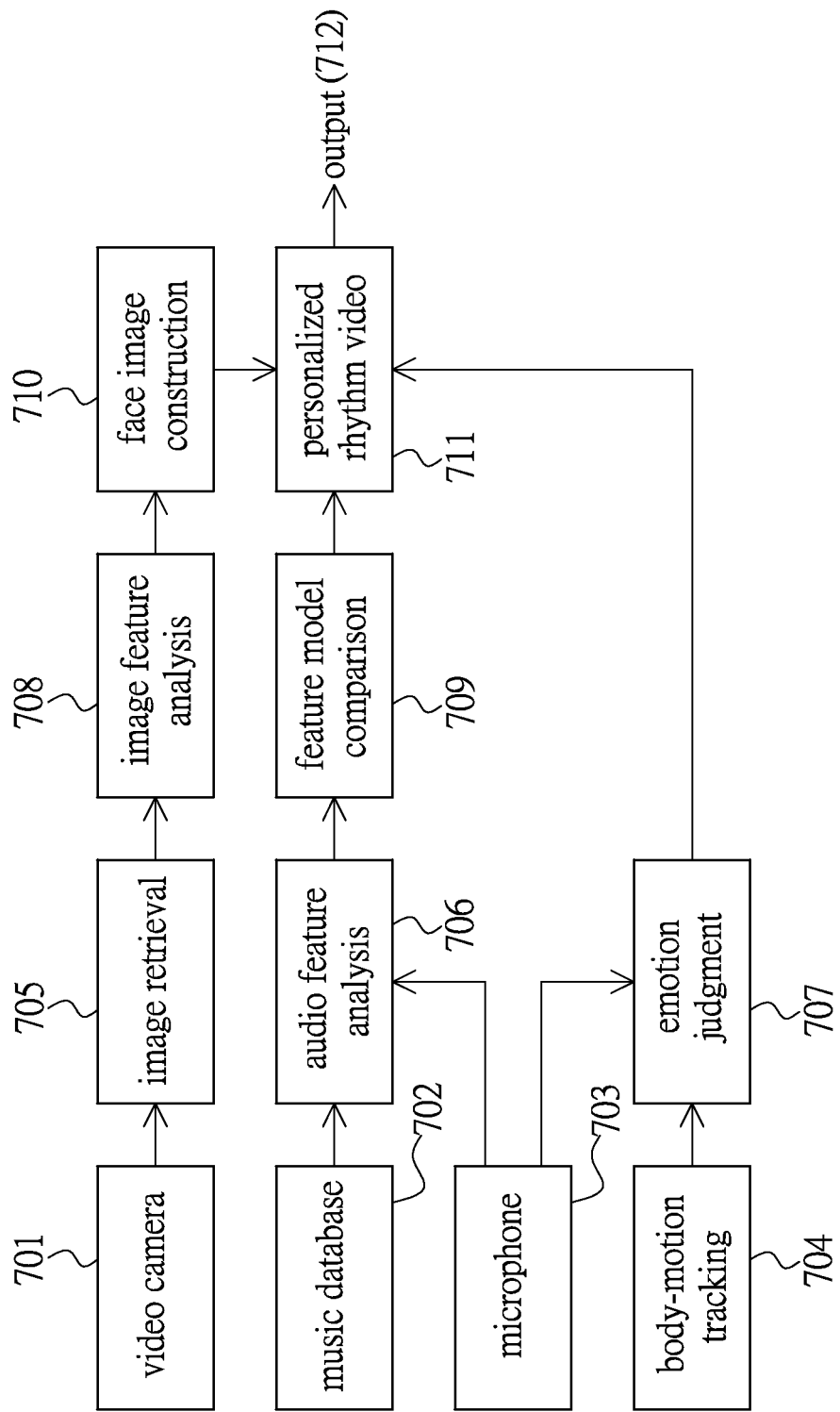
FIG. 7 shows a schematic diagram describing a framework of the system of rhythm visualization in one embodiment of the present invention.

Reference next is made to FIG. 7 depicting a framework to implement the method for visualizing rhythm in one embodiment of the present invention. The related system may be implemented by many modular functions as follows.

A video camera 701 is such as a camera module disposed in the portable electronic apparatus. For example, the camera module is the camera disposed in the cellular phone or tablet computer. The image made by the video camera 701 is retrieved by function of image retrieval (705) in the apparatus. The image signals are then stored in a memory of apparatus. Next, the portable electronic apparatus may generate a personalized image by its own computation capability. The function of image feature analysis (708) implemented in the apparatus is used to retrieve features from the image. In an exemplary example, the function of image feature analysis (708) determines the positions of the facial organs from the face image if the image is such as a face image. Then the personal features represent a position of one selected from facial organs within the face image, and also a plurality of relative positions of the rest facial organs with respect to the selected facial organ can be obtained. The function of face image construction (710) is used to create an image of human face. This face image may appear a deconstructed image. For example, the deconstructed image may be formed by various dynamic elements such as variations of sizes, shapes, colors, positions or/and flashing, so as to show a personalized rhythm video 711, reference is made to FIG. 1.

The portable electronic apparatus may store some music files. For example, the apparatus may be disposed with a music database 702 according to one of the embodiments of the present invention. In one further embodiment, the music database 702 may be established in an external server which allows the terminal device to retrieve and play the audio signals in streaming process. The function of audio feature analysis (706) made by the portable electronic apparatus may be a software-implemented method which is to resolve the frequency domain features of audio signals. The audio features are extracted by comparing frequency domain signal features extracted from audio signals sampled within a period of time with audio models recorded in a database. These audio features are such as the tempo, speed, and intensity extracted from the audio signals by means of feature model comparison (709). The function of emotion judgment (707) may therefore find out the corresponding emotion as introducing the information in a database and a lookup table. The emotion may render a type of representation of the rhythm video (711), for example in view of the audio features.

The portable electronic apparatus has an audio-receiving module such as microphone (703). Through the audio-receiving module, the apparatus may retrieve the user's voice and environmental sound. The function of audio feature analysis (706) is used to resolve the frequency signals. The function of feature model comparison (709) is incorporated to acquiring tempo, speed, and intensity of the audio signals. The function of emotion judgment (707) is to specify an emotion which is referred to showing the rhythm image.

The portable electronic apparatus further performs a function of body-motion tracking (704) which is implemented by circuits. This function is to sense rhythm signals when the user manipulates the portable electronic apparatus. Specifically, the body-motion tracking circuits generate acceleration signals as shaking the portable electronic apparatus. By analyzing the body-motion signals, shaking amplitude, tempo, and an indication direction of the portable electronic apparatus may be determined. The function of emotion judgment (707) is used to specify an emotion in response to the audio features. A type of representation of the rhythm image may be decided. A personalized rhythm video (711) is created.

When the personalized rhythm video (711) in response to the full or part of the features with respect to rhythm information is created, the signals may be outputted (712) over a wireless network or mobile communication network. The video (711) may be outputted to a server host including shard to a network host, community, or other users.

The flows shown in FIGS. 8 through 12 illustrate the method of rhythm visualization according the embodiments of the present invention.

Figure 8:
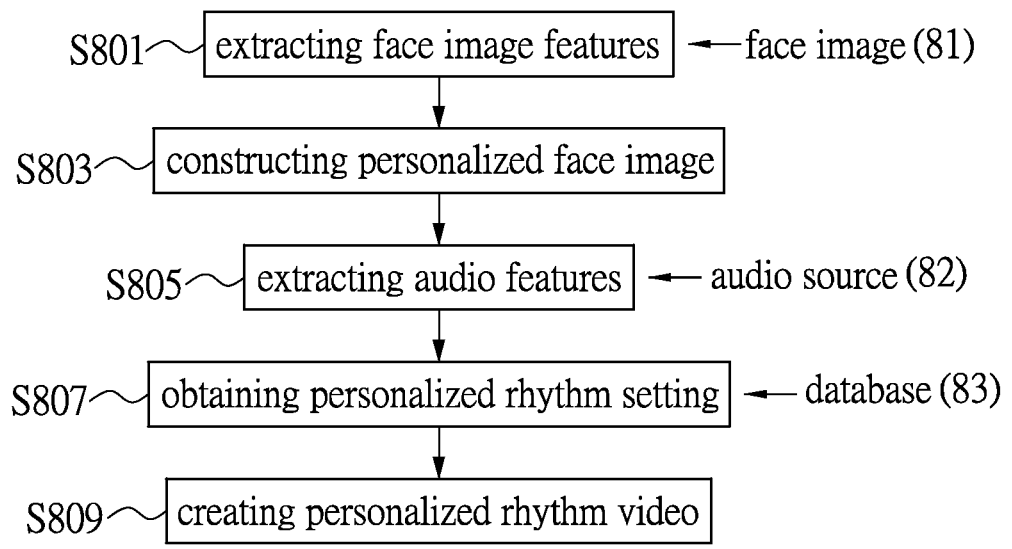
FIG. 8 shows a flow chart illustrating method for visualizing rhythm in one embodiment of the present invention.

Reference is made to the flow described in FIG. 8. In the beginning such as step S801, an image is obtained. The image may be made by a camera module of the portable electronic apparatus. The image is such as a face image (81). The image may be selected from photo files stored in the apparatus. The image may also be other kinds of pictures with the personal characteristics, for example a cartoon character or an animal icon representing the user.

In next step S803, a personalized image is constructed based on the personal features extracted from the face image. The personalized image may be presented through assembly of graphic symbols, geometric icons, or other pictures. The composition may be dynamically changed in response to the audio features extracted from the signals made by source (82), such as step S805. A personalized rhythm setting is therefore established in step S807 as incorporating a database (83) to performing comparison with the personalized image and audio features.

It is noted that the personalized rhythm setting records a rhythm mode and frequency with respect to the personalized image. That means the rhythm mode and frequency corresponding to the personalized image can be decided according to the audio signals in view of the personalized rhythm setting. Furthermore, the any consideration may also be in view of body-motion signals which allow the system to more precisely define an expressive intensity of the personalized image. A personalized rhythm video is created specifically based on the audio signals, the personalized image, the mode and frequency of rhythm in the personalized rhythm setting, and the expressive intensity.

In step S809, it is noting that the audio signals vary with time. The audio features extracted from the audio signals are such as the frequency and intensity. The personalized rhythm video based on the audio features may efficiently reflect the rhythm, for example incorporating the variations of colors, sizes and positions of the elements in the video.

It is noted that the conventional technology such as TW200731095, published on Aug. 16, 2007, which is related to the technology converting the audio signals into visual pictures, may be referred, but not used to limit the scope of the present invention. The conventional technology derives at least one element from an audio stream. A selected visual data, such as a dynamic or static image, according to the disclosed method is synchronized with the audio stream automatically. The related system receives the features such as frequency, time, intensity or even the location of the audio signals for beforehand generating visualized effects. A visualized image is therefore obtained as combing the visual effects. Synchronous audio and visual effects may be triggered in real-time.

Further, one of the methods to deconstruct the image into geometric icons may be referred to music-visualizer system and methods disclosed in U.S. Pat. No. 8,502,826 published on Aug. 6, 2013. This conventional technology allows the music waveforms converted to geometric icons.

In the process of converting the music waveforms into geometric icons, this conventional technology predefines several variations of icons, such as variations of positions and colors. The graphic conversion is performed using a trigonometric function in view of geometric data. The method is therefore producing the music visualization effect in real time.

Figure 9:
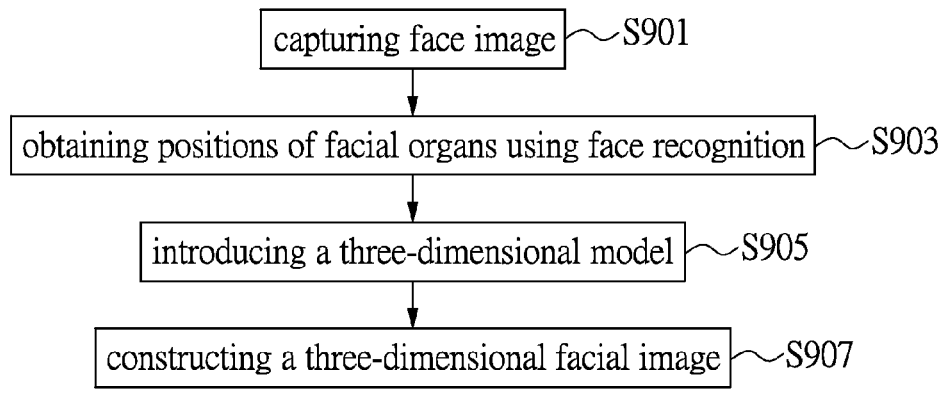
FIG. 9 shows one further flow chart illustrating creating three-dimensional face image in the method in one embodiment of the present invention.

Reference is made to FIG. 9 depicting an example to construct a personalized image using a face image especially a three-dimensional face image.

In step S901, the system firstly acquires a face image. In next step S903, an image recognition technology is introduced to identify the facial organs from the face image, including position of at least one facial feature. Some other features such as type of face or even the stature of the user such as height and weight may not be excluded. It is preferred that the system is able to identify the relative positions of a specific facial organ and other organs (step S903). For example, the relative distances and proportions among the eyes, nose, mouth, and ears. A three-dimensional model is further introduced (step S905). The three-dimensional model is introduced with recognition of the relative positions of the specific facial organ with respect to the other facial organs, so as to construct a three-dimensional face image (step S907). This three-dimensional face image is then displayed on a terminal display. Similarly, this face image may be constructed with various symbols and geometric icons, and changed synchronously with audio features in real-time. It is noted that a three-dimensional animation is created with the rhythm features extracted from the audio signals combined with the varied colors and tempos.

In an exemplary example, one method to construct the three-dimensional face image is to introduce a three-dimensional model which incorporates a Morphable Face Model. Morphable Face Model firstly acquires a shape and texture of a face image and performs a comparison with coefficients recorded in a model library. A three-dimensional face image is formed by point-to-point comparison. The shape and texture of the face is described as a vector space which is used to depict a three-dimensional image.

Figure 10:
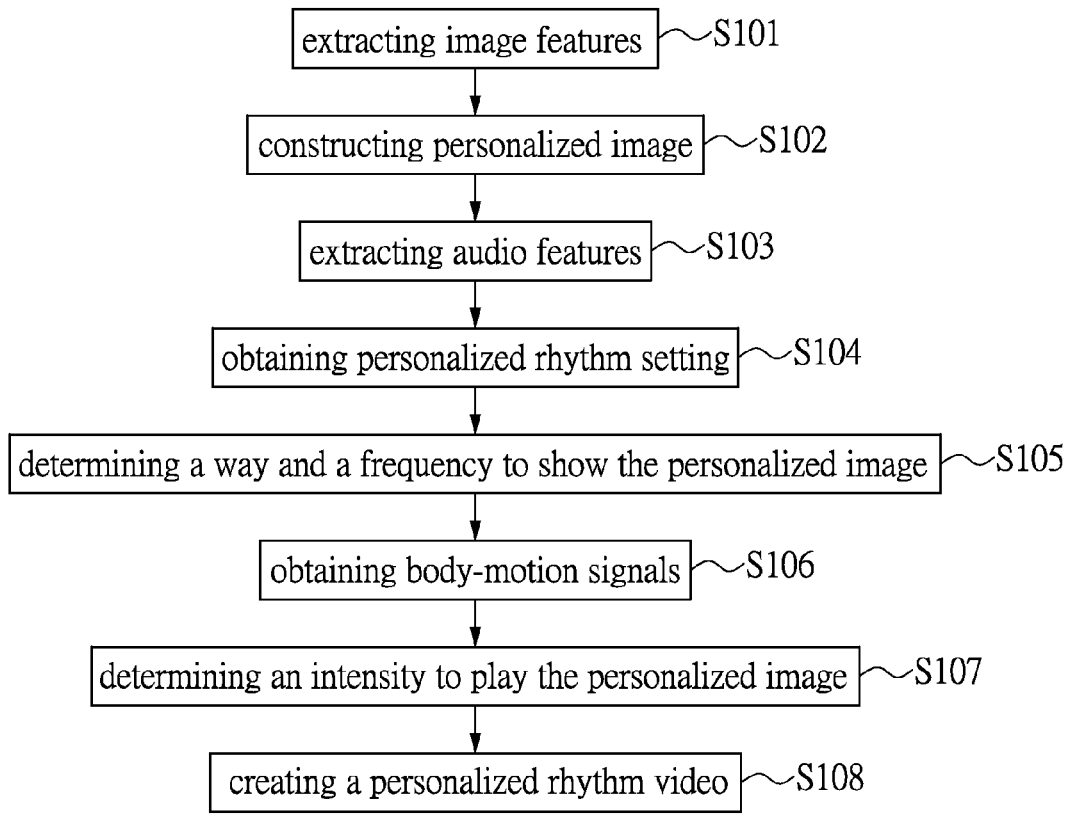
FIG. 10 shows a flow chart illustrating the method for visualizing rhythm in one embodiment of the present invention.

FIG. 10 shows a flow illustrating a method for visualizing rhythm in one embodiment of the present invention.

In the beginning, such as step S101, the image features are firstly extracted, by which constructing a personalized image (step S102). The image may be formed as a two-dimensional image or a three-dimensional image. The system may then extract audio features from audio signals (step S103). A personalized rhythm setting with respect to the audio features is then obtained from multiple pre-stored rhythm settings in a database (step S104). The combination of audio signals, the personalized image, and the personalized rhythm setting renders rhythm mode and frequency for conducting the personalized video (step 105).

In the present embodiment, in step S106, as forming the personalized rhythm video, the body-motion signals may be acquired at the same time. The body-motion signals may be generated by the sensor circuit disposed in the portable electronic apparatus. The body-motion signals preferably reflect an intensity of waving the handheld apparatus. The intensity is referred for the personalized image to show its expressive intensity (step S107). A personalized rhythm video is therefore created based on the audio features, such as step S108.

Figure 11:
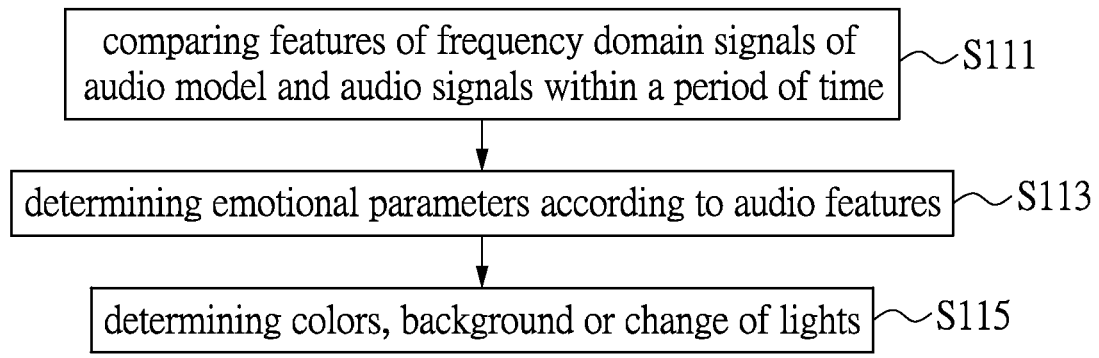
FIG. 11 shows a flow chart for determining a way to display the personalized image with respect to the audio features in the method for visualizing rhythm according to one embodiment of the present invention.

The technology to identify a type of emotion may be referred to the flow shown in FIG. 11. The step in the method is to compare the frequency domain signal features of an audio model and audio signals within a period of time (step S111). The extracted audio features are used to decide emotional parameters (step S113). These emotional parameters are configured to define colors, background and/or variation of light intensity of the personalized image generated by the portable electronic apparatus (step S115). However, the any change of the personalized image may not be limited by the foregoing methods.

There are several ways to identify the type of emotion based on the audio signals. One of the conventional technologies, not exclusive, is such as media player for playing media files by emotion classes and method for the same disclosed in US20090132593, published on May 21, 2009. According to description of US20090132593, the media files should be classified into appropriate emotion classes, wherein the emotion classes may include blue, passion and cantabile etc. The emotion classes are referred to establish a psychology model. This conventional technology plays media file based on the emotion classes. The mentioned elements are such as speed, intensity, rhythm, melody, and tone color. A media list may be configured according to the emotion classes with respect to the media to be played. The user therefore selects one of the lists in response the instant emotion. In which, this application provides a music emotion classifying unit. The music emotion classifying unit extracts the music elements, and performs a comparison with preset psychology models for determining an emotion class.

The emotion determination according to the present invention is not limited to the foregoing conventional technology based on a software-implemented music analysis. The analysis method for determining the emotion may be emotional ontology, artificial neutral network, textual analysis or emotional dictionary for lyrics. Genre of music may also be determined by analyzing the rhythm. The genre of music may also reflect a type of emotion. Further, the lyrics analysis may also resolve the emotion since the analysis incorporates a database to be used to resolve the emotion. The database records the correlation of the genre of music and types of emotions, and lyrics and emotions.

A non-transitory computer-readable medium is also provided in the present invention. The medium records an instruction set for performing the method for visualizing rhythm. The instruction set includes instruction for acquiring an image. This instruction may be executed in the portable electronic apparatus. The instruction set includes instruction for extracting personal features from the image, which may be executed in the portable electronic apparatus, or a server end. The instruction set includes instruction for creating a personalized image according to the personal features, which may be executed in the portable electronic apparatus or the server end. The instruction set includes instruction for acquiring audio signals. For example, the audio signals may be generated by the portable electronic apparatus playing internal files, or receiving external audio signals through microphone. The instruction set includes instruction for extracting audio features from the audio signals. Similarly, the portable electronic apparatus or server host performs this instruction to conduct feature extraction.

The instruction set further includes instructions for acquiring a personalized rhythm setting corresponding to the audio features from a plurality of pre-stored rhythm settings, and creating a personalized rhythm video according to the audio signals, the personalized image, and the personalized rhythm setting; and displaying the personalized rhythm video.

Thus, the technology of rhythm visualization in accordance with the present invention is based on the information received from person or group-generated audio or body motion. A personalized rhythm video can be created according to audio signals, personalized image, and every personalized rhythm setting. While integrating the multiple personalized rhythm data, a group rhythm video with music is therefore created and displayed. One of the objectives of the present invention brings a lot of fun for person to listen to music, and even share with others or public over online concert, interact with friends through network community. Therefore, people may experience sympathetic responses with others by this invention.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A method for visualizing rhythm, comprising:
   acquiring personal features from an image;
   creating a personalized image in accordance with the personal features;
   extracting audio features from audio signals, and obtaining a personalized rhythm setting corresponding to the audio features from a plurality of pre-stored rhythm settings; and
   creating a personalized rhythm video in accordance with the audio signals, the personalized image, and the personalized rhythm setting;
   wherein the personalized rhythm setting comprises one of the color variation, the size variation, the position variation, the shape variation, and the frequencies of the rotation and swing of the personalized image.

2. The method of claim 1, wherein the image is captured by a camera module of a portable electronic apparatus and stored to a memory.

3. The method of claim 2, wherein the personalized rhythm video is created by the portable electronic apparatus in accordance with the audio signals, the personalized image, and the personalized rhythm setting.

4. The method of claim 2, wherein the portable electronic apparatus further comprises a body-motion unit for obtaining a body-motion signal and creating the personalized rhythm video in accordance with the audio signals, the personalized image, the personalized rhythm setting, and the body-motion signal.

5. The method of claim 4, wherein the personalized rhythm setting include a rhythm mode and a rhythm frequency for the personalized image with respect to the audio signals; and the personalized rhythm video is generated according to the audio signals, the personalized image, the personalized rhythm setting, and the body-motion signal, wherein:
   the rhythm mode and the rhythm frequency for the personalized image are determined according to the audio signals and the personalized rhythm setting render;
   an expressive intensity of the personalized image is determined according to the body-motion signal; and
   the personalized rhythm video is determined according to the rhythm mode, the rhythm frequency, and expressive intensity.

6. The method of claim 1, wherein the image is a face image, and the personal features represent a position of one selected from facial organs within the face image, and a plurality of relative positions of the rest facial organs with respect to the selected facial organ.

7. The method of claim 6, wherein the personalized image is a three-dimensional face image which is created based on the position of the selected facial organ, and the plurality of relative positions of the rest facial organs with respect to the selected facial organ through a three-dimensional model.

8. The method of claim 1, further comprising:
   determining a type of emotion with respect to the audio signals according to the audio features; and
   determining color, background, or variation of light intensity with respect to the personalized image according to the type of emotion.

9. The method of claim 8, wherein the audio features are extracted by comparing frequency domain signal features extracted from audio signals sampled within a period of time with audio models recorded in a database.

10. The method of claim 1, wherein, a multimedia file is generated by integrating the personalized rhythm video and the audio signals, and the multimedia file is transferred to a server host.

11. The method of claim 10, further comprising:
    generating individual personalized rhythm videos by a plurality of portable electronic apparatuses of a plurality of users;
    transferring the personalized rhythm videos to the server host via a communication network; and
    receiving the personalized rhythm videos and generating a group rhythm video to integrate the personalized rhythm videos by the server host.

12. A system of rhythm visualization, comprising:
    an image retrieving unit, used to retrieve an image;
    an audio retrieving unit, used to receive audio signals;
    a feature retrieving unit, used to retrieve personal features and audio features, wherein the personal features are extracted from the image acquired from the image retrieving unit, and the audio features are extracted from the audio signals made by the audio retrieving unit;
    a computing unit, coupled to the feature retrieving unit, wherein, when acquiring the personal features and audio features, and acquiring a personalized rhythm setting with respect to the audio features from pre-stored rhythm settings, a personalized rhythm video is generated according to the audio signals, the personal features, and the personalized rhythm setting; and
    a display unit, used to display the personalized rhythm video;
    wherein the personalized rhythm setting comprises one of the color variation, the size variation, the position variation, the shape variation, and the frequencies of the rotation and swing of the personalized image.

13. The system of claim 12, wherein the system is embedded in a portable electronic apparatus, and used to form the personalized rhythm video.

14. The system of claim 13, further comprising: a body-motion unit used to obtain an acceleration signal, and the computing unit acquiring the personalized rhythm video while receiving the acceleration signal.

15. The system of claim 12, wherein the image retrieving unit, the audio retrieving unit, and the display unit are disposed in a portable electronic apparatus; the feature retrieving unit and the computing unit are disposed in a server host; and the portable electronic apparatus further comprises a communication unit used to communicate with the server host, and to transfer the image and the audio signals to the server host; and the display unit displays the received personalized rhythm video.

16. The system of claim 12, wherein the system is configured to be divided into multiple portable electronic apparatuses and a server host, the every portable electronic apparatus includes the image retrieving unit, the audio retrieving unit, the feature retrieving unit, the computing unit, and a communication unit which is provided for transferring the individual personalized rhythm video to the server host; the server host integrates the multiple videos and creates a group rhythm video while receiving the personalized rhythm videos.

17. A non-transitory computer-readable medium, recording an instruction set for performing a method for visualizing rhythm, wherein the instruction set comprises:
- instruction for acquiring an image;
- instruction for extracting personal features from the image;
- instruction for creating a personalized image according to the personal features;
- instruction for acquiring audio signals;
- instruction for extracting audio features from the audio signals;
- instruction for acquiring a personalized rhythm setting corresponding to the audio features from a plurality of pre-stored rhythm settings;
- instruction for creating a personalized rhythm video according to the audio signals, the personalized image, and the personalized rhythm setting; and
- instruction for displaying the personalized rhythm video;
- wherein the personalized rhythm setting comprises one of the color variation, the size variation, the position variation, the shape variation, and the frequencies of the rotation and swing of the personalized image.

* * * * *